Patented July 13, 1926.

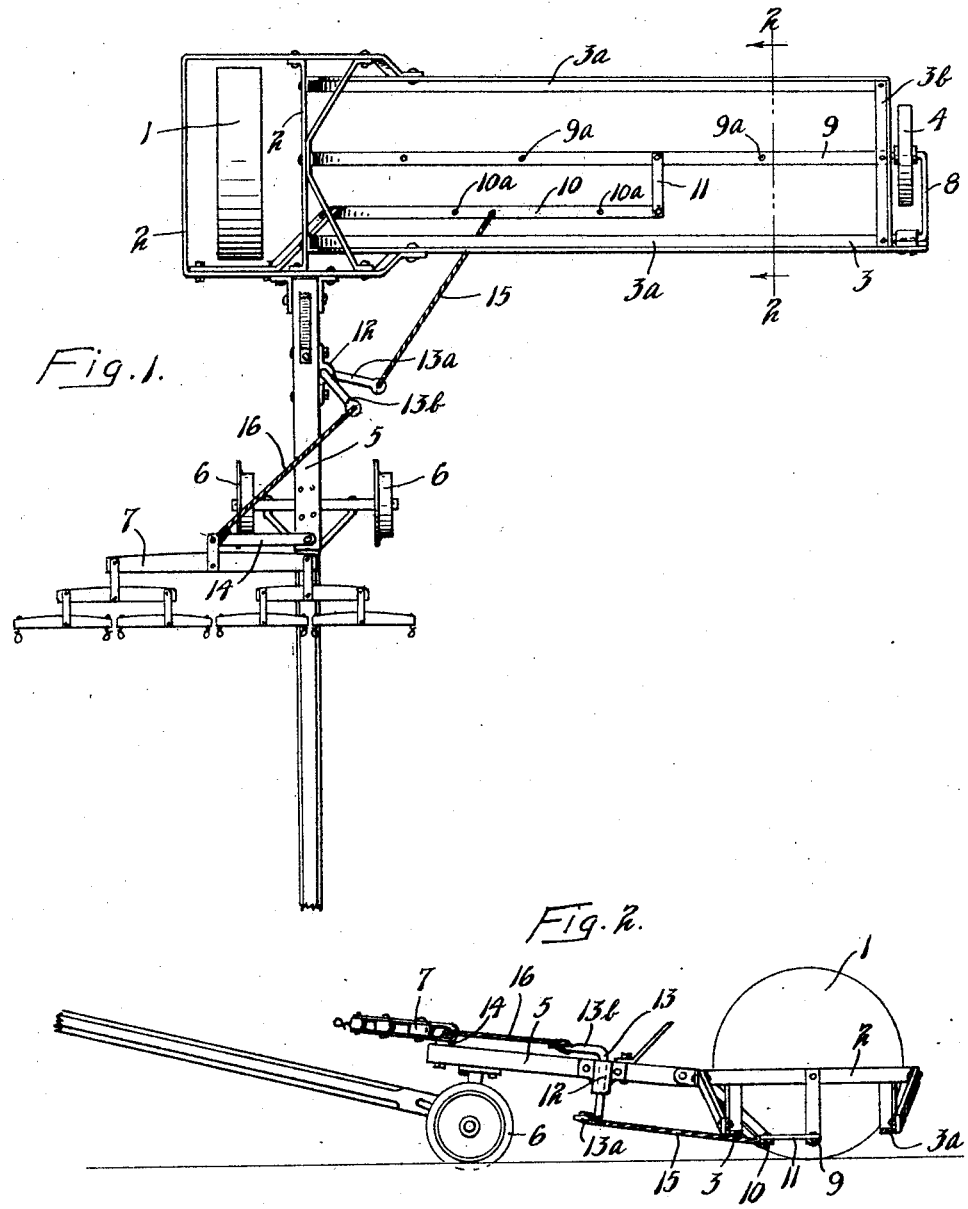

1,592,652

UNITED STATES PATENT OFFICE.

THOMAS BERSKOW, OF ELBOW LAKE, MINNESOTA.

SIDE-DRAFT DEVICE.

Application filed July 16, 1924. Serial No. 726,285.

This invention relates to a grain cutting machine such as the modern so called binder used to cut wheat and other grain. Such machine comprises among other parts, a grain platform extending at one side of the machine, the front of which carries the sickle, which platform is supported at its outer end by a comparatively small and light wheel called the grain wheel. The greater part of the weight of the binder is supported on the bullwheel, which is disposed under the binder part proper of the machine and more in line with the tongue.

In cutting heavy grain and frequently when moving through soft ground, the strain upon the grain platform and its parts is such as to make the grain platform and grain wheel drag back of their proper position. This places a great strain upon the frame of the platform and other parts of the machine and interferes with the proper operation thereof.

It is an object of this invention to provide a draft equalizing means whereby the strain upon the grain platform will be applied more nearly the center thereof so that any drag of the platform and grain wheel will be prevented.

It is a further object of the invention to provide such a draft equalizing means comprising a member swiveled about a vertical axis, having arms, one of which is connected to the grain platform and the other of which is connected to the point on the binder to which the double tree or other traction means is connected.

It is also an object of the invention to provide in connection with said draft equalizing means a plurality of bars extending longitudinally of the grain platform to one of which the draft equalizing means is connected.

These and other objects and advantages of the invention will be fully set forth in the following description made in connection with the accompanying drawing, in which like reference characters refer to the same parts throughout the different views and in which—

Fig. 1 is a plan view of certain parts of a binder showing the invention applied thereto; and Fig. 2 is a view in vertical section taken on the line 2—2 of Fig. 1 as indicated by the arrow.

Referring to the drawings, certain parts of the modern binder are illustrated, of which it will only be necessary to consider the master wheel 1, frame portion 2, the platform 3 supported at its outer end by the grain wheel 4, the tongue 5 secured at its rear end to the frame 2, the front truck wheels 6 and the double tree 7, carrying the other trees to which the horses will be hitched. The grain platform 3 usually comprises the longitudinally extending front and rear members 3ª and an end member 3ᵇ, the grain wheel 4 being disposed outward of the end member 3ᵇ by means of auxiliary bracket 8.

In accordance with the present invention a strong rigid bar 9 is provided and secured to the end member 3ᵇ substantially centrally thereof, which bar is secured at its other end to a portion of the frame 2 of the binder. While said bar 9 may be of any suitable and convenient type, in the embodiment of the invention illustrated the same is shown as in the form of a flat iron bar. Another bar 10 is provided of similar shape which will be attached to the frame 2 at one end and extend rearwardly to a point beneath the platform 3 and will then extend longitudinally beneath said platform to a point a considerable distance from the end member 3ᵇ, the end of bar 10 being connected to the bar 9 by a short bar 11 extending substantially at right angles to bars 9 and 10. Bars 9 and 10 preferably will be secured to the bottom of the platform 3 or to certain cross members thereof by bolts passing through the holes 9ª and 10ª therein.

A bracket 12 is attached to the tongue 5, at the side thereof on which the platform 3 is disposed and a member 13 having a substantially vertical central portion, is swiveled in bracket 12, said member having a lower arm 13ª and an upper arm 13ᵇ, said arms being spaced circumferentially, the arm 13ᵇ being adapted to swing above the tongue 5 while the arm 13ª is disposed slightly above or substantially in line with the front end of platform 3. The double tree 7, or other draft means for the binder, is usually, as shown, connected to the outer end of an arm 14 pivotally connected to the top of tongue 5 and projecting from said tongue at the side opposite the platform 3. A tension member 15 is connected to the end of arm 13ª and connected at its other end to an intermediate point of the bar 10. Another tension member 16 is shown as connected to the end of arm 13^b and at its other end is connected at the end of arm 14. While the tension members 15 and 16 may be of various forms, in the embodiment of the invention illustrated they are shown as comprising ropes or cables. The members 15 and 16 thus comprise in effect one flexible means having lever 13 inserted at an intermediate point therein.

In operation the binder will be drawn forward by horses hitched to the various trees afforded by members 7 and the grain will be cut in the usual manner. Any tendencies of the platform 3 to be distorted due to the backward strain thereon will be resisted by the bars 9, 10 and 11 and any dragging movement rearward by said platform will be prevented by the tension means including members 13, 15 and 16. If a sudden strain is placed on the platform, as when the horses give a jerk or move forward rapidly, so that arm 14 is swung forwardly, the pull will be transmitted to the grain platform 3 through the members 16 and 15, said member 13 swiveling in such movement. The tendency of the grain platform 3, therefore, to drag back and be distorted under such accelerating movements is eliminated. All traction pulls are transmitted directly and instantly to the platform and at a point a considerable distance outward thereof. It, of course, is not possible to have a tension member extending out to the end of the platform on account of its interference with the grain.

From the above description is seen that applicant has provided a simple and efficient draft equalizing means, and one which will prevent excessive stress on the grain platform, and the consequent distortion of said platform and rearward drag thereof. The device is very simple in construction and can readily be applied to any standard binder. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in such a device as disclosed and defined in the appended claims.

What is claimed is:—

1. A side draft device for a machine having a platform extending at one side thereof, comprising in combination with the tongue and said platform a member pivoted to said tongue and having arms extending above and below said tongue, an arm pivoted to said tongue outward from said member and extending laterally from said tongue to form the point of attachment of the double tree of the machine, a tension member extending between said last mentioned arm and the upper arm of said member and a tension member extending between the lower arm of said member and an intermediate point on said platform.

2. A side draft device for a machine having a platform extending at one side of the tongue thereof, comprising in combination with the tongue and platform of the machine, an arm pivoted to said tongue and extending laterally therefrom, said arm forming the point of attachment of the double tree of said machine, a bracket fixed inwardly of said arm on said tongue, a lever having an intermediate portion journaled in said bracket and having two end portions extending respectively above and below said tongue, a tension member secured to said upper end portion of said lever and to said first mentioned arm and a tension member secured to said lower end portion of said lever and an intermediate portion of said platform.

3. A side draft device for a machine having a platform extending at one side of the tongue thereof, comprising in combination with the tongue and said platform an arm pivoted to said tongue and extending laterally therefrom, said arm forming the point of attachment of the double tree of said machine, a lever having a vertically intermediate portion pivoted to said tongue and horizontally extending portions above and below said tongue, the portion of said lever below said tongue being substantially in line with said platform, a tension member extending between said first mentioned arm and the upper horizontal portion of said lever, and a tension member extending between the lower horizontal portion of said lever and an intermediate portion of said platform.

4. A side draft device for a binder and the grain platform thereof comprising in combination with the tongue and said platform a member swiveling about a vertical axis and secured to said tongue, and having vertically and circumferentially spaced arms, a tension member extending from the lower arm and secured at an intermediate point of the grain platform, an arm pivoted to said tongue forward of said member and extending laterally therefrom, and a tension member secured to the upper arm of said member and to the end of said last mentioned arm, said last mentioned arm forming the point of attachment of the double tree for the binder.

In testimony whereof I affix my signature.

THOMAS BERSKOW.